United States Patent [19]

Morinaga et al.

[11] Patent Number: 5,804,520
[45] Date of Patent: Sep. 8, 1998

[54] CRYSTALLIZED GLASS FOR SUBSTRATE OF INFORMATION-RECORDING DISK

[75] Inventors: Kenji Morinaga, Nakagawa-machi; Yuji Akimoto, Fukuoka; Fumiyuki Shimizu, Chikushino; Mineto Iwasaki, Tosu; Naoto Shindo, Ohnojo, all of Japan

[73] Assignee: Sec Inc., Tokyo, Japan

[21] Appl. No.: 941,472

[22] Filed: Sep. 30, 1997

[30] Foreign Application Priority Data

Oct. 4, 1996 [JP] Japan ................................. 8-281592
Aug. 13, 1997 [JP] Japan ................................. 9-230479

[51] Int. Cl.[6] ........................... C03C 10/04; C03C 10/14
[52] U.S. Cl. ...................................... 501/4; 501/5
[58] Field of Search ................... 501/4, 5, 56, 57; 428/694 ST

[56] References Cited

U.S. PATENT DOCUMENTS

| 5,064,460 | 11/1991 | Aitken et al. | 501/3 |
| 5,567,217 | 10/1996 | Goto et al. | 501/5 |
| 5,691,256 | 11/1997 | Taguchi et al. | 501/5 |
| 5,744,208 | 4/1998 | Bealle et al. | 501/4 |

FOREIGN PATENT DOCUMENTS

| 50-94017 | 7/1975 | Japan . |
| 62-72547 | 4/1987 | Japan . |
| 6-29152 | 4/1994 | Japan . |
| 6-329440 | 11/1994 | Japan . |
| 8-25775 | 3/1996 | Japan . |
| 2516553 | 4/1996 | Japan . |

Primary Examiner—Karl Group
Attorney, Agent, or Firm—Flynn, Thiel, Boutell & Tanis, P.C.

[57] ABSTRACT

A crystallized glass for a substrate of an information-recording disk, which has been obtained by melting a glass forming material consisting essentially of, in wt. % as oxide, 55 to 85% of $SiO_2$, 5 to 20% of $Li_2O$, 0 to 10% of $K_2O+Na_2O$, 0 to 10% of MgO, 0 to 20% of CaO, 0 to 10% of SrO, 0 to 10% of BaO, 0 to 10% of ZnO, 0 to 10% of $Al_2O_3$, 0 to 15% of $B_2O_3$, 0 to 6% of $P_2O_5$, 0 to 3% of $TiO_2$, 0 to 3% of $ZrO_2$, 0 to 3% of $SnO_2$ and 0 to 1% of $As_2O_3+Sb_2O_3$, 0.1 to 10 wt. % of F and 0.1 to 20 wt. % of Cl, molding, vitrifying and crystallizing the material, and which contains at least 0.05% by weight of chlorine after crystallization. The glass forming material may further contain 0 to 10% of $Fe_2O_3$, 0 to 10% of $Cr_2O_3$, 0 to 10% of NiO, 0 to 10% of $V_2O_5$, 0 to 10% of CuO, 0 to 10% of $MnO_2$, 0 to 10% of $MoO_3$, the total of $Fe_2O_3+Cr_2O_3+NiO+V_2O_5+CuO+MnO_2+MoO_3$ being 0.5 to 10%, and 0 to 3% of $CeO_2$. The crystallized glass has a microcrystalline structure and surface properties desirable as a substrate material for an information-recording disk as well as excellent meltability and moldability.

2 Claims, No Drawings

CRYSTALLIZED GLASS FOR SUBSTRATE OF INFORMATION-RECORDING DISK

BACKGROUND OF THE INVENTION

1. Field of the Invention

The present invention relates to a crystallized glass having an excellent meltability and moldability as well as a microcrystalline structure and improved surface properties after polishing which make the glass suitable for the use as a material for a substrate of an information-recording disk such as a magnetic disk, optomagnetic disk or digital video disk.

2. Description of the Prior Art

Recently, the use of magnetic disks, optomagnetic disks, etc. as external recording media for large computers, personal computers, etc. is increasing. For the coming information age, the development of information-recording disks capable of having a high-density record such as magnetic disks, optomagnetic disks and digital video disks is eagerly demanded.

The following properties are required as the substrates of information-recording disks for a high-density recording:

(1) The disk surface is flat and smooth so as to improve the recording density by further reducing the head floating amount for the purpose of practically using GMR heads and TMR heads. Particularly, the surface roughness (Ra) of the substrate is desirably not higher than 10 Å.

2) The substrate material is not anisotropic and is free from defects, and the structure thereof is dense, homogeneous and fine.

(3) The substrates have a mechanical strength and hardness resistant to e.g. a high-speed rotation and the contact with the head.

(4) The substrates have a chemical durability sufficient for being resistant to washing with various chemicals and etching.

(5) The substrates are as light in weight as possible.

(6) When a glass material is used, it is easily melt-molded, and its homogeneity, denseness, thermal expansion coefficient and crystal size are unchanged even when the production conditions are changed to some extent, and it has an excellent mass productivity.

(7) In a CSS (contact-start-stop) hard disk device, a precise texturing can be easily conducted so as to prevent the stick (adsorption) at the start or stop of the disk.

Heretofore, aluminum alloys have generally been used as a material for substrates for magnetic disks. However, since the surface smoothness of the aluminum alloys is limited and unsuitable for a high-density recording, various crystallized glasses have been proposed to be used in place of the aluminum alloys. The crystallized glasses have high mechanical strength and hardness, and dense, smooth crystallized glasses can be easily obtained advantageously.

It is known that an $SiO_2$-$Li_2O$ glass produced by forming $LiO_2 \cdot 2SiO_2$ crystals using $P_2O_5$ as disclosed in, for example, Japanese Patent Laid-Open No. 72547/1987 and Japanese Patent Publication No. 25775/1996 has a high mechanical strength and is suitable for the disk.

However, these crystallized glasses have a problem that the size of the microcrystals thus formed and coefficient of thermal expansion thereof significantly vary depending on even a slight change of the heat treatment temperature.

Although this problem is solved by a crystallized glass comprising $SiO_2$-$Li_2O$-MgO-$P_2O_5$ as described in Japanese Patent Publication No. 29152/1994 and Japanese Patent No. 2516553, the formed crystals have a relatively large grain size of at least 0.3 μm and, therefore, the surface roughness (Ra) is as high as at least 10 Å even after polishing the surface, which is unsuitable for the high-density recording.

The raw materials for these crystallized $SiO_2$-$Li_2O$ system glasses have a high melting temperatures and the production costs of the glasses are high. When the melting temperature is high, foams and striae cannot be easily removed unfavorably. Namely, since the foams exert an influence on the surface roughness after polishing, even extremely small foams which are allowed in optical glasses are not allowed in the substrates of magnetic disks and optomagnetic disks. When the substrate has the striae, the local composition becomes uneven to reduce the uniformity and denseness of the microcrystals.

SUMMARY OF THE INVENTION

Under these circumstances, an object of the present invention is to improve the smoothness of the polished surface by controlling the size of the formed crystal grains by overcoming the defects of the prior art as described above and thereby obtaining a crystallized glass substrate which makes it possible to produce magnetic disks, optomagnetic disks, digital video disks, etc., usable for the high-density recording.

Another object of the present invention is to obtain a crystallized glass substrate for the information-recording disks, whose raw material has a low melting temperature and which is free from the formation of foams or striae.

Still another object of the present invention is to obtain a crystallized glass substrate, having improved texturing properties, for obtaining excellent CSS (contact-start-stop) characteristics, particularly a crystallized glass substrate capable of texturing with a laser.

After intensive investigations, the inventors have found that the above-described objects can be attained by adding chlorine to the crystallized $SiO_2$-$Li_2O$ glass. The present invention has been completed on the basis of this finding.

Namely, the gist of the present invention resides in a crystallized glass for a substrate of an information-recording disk, which has been obtained by melting a raw material for glass consisting essentially of, in weight percentages in terms of oxide, 55 to 85% of $SiO_2$, 5 to 20% of $Li_2O$, 0 to 10% of $K_2O$+$Na_2O$, 0 to 10% of MgO, 0 to 20% of CaO, 0 to 10% of SrO, 0 to 10% of BaO, 0 to 10% of ZnO, 0 to 10% of $Al_2O_3$, 0 to 15% of $B_2O_3$, 0 to 6% of $P_2O_5$, 0 to 3% of $TiO_2$, 0 to 3% of $ZrO_2$, 0 to 3% of $SnO_2$ and 0 to 1% of $As_2O_3$+$Sb_2O_3$, 0.1 to 10% by weight of fluorine (F) and 0.1 to 20% by weight of chlorine (Cl), molding the molten material, vitrifying the molded material and subjecting the vitrified material to crystallizing treatment, and which contains at least 0.05% by weight of chlorine after the crystallizing treatment.

The gist of the present invention also resides in a crystallized glass for a substrate of an information-recording disk, which has been obtained by melting a raw material for glass consisting essentially of, in weight percentages in terms of oxide, 55 to 85% of $SiO_2$, 5 to 20% of $Li_2O$, 0 to 10% of $K_2O$+$Na_2O$, 0 to 10% of MgO, 0 to 20% of CaO, 0 to 10% of SrO, 0 to 10% of BaO, 0 to 10% of ZnO, 0 to 10% of $Al_2O_3$, 0 to 15% of $B_2O_3$, 0 to 6% of $P_2O_5$, 0 to 3% of $TiO_2$, 0 to 3% of $ZrO_2$, 0 to 3% of $SnO_2$ and 0 to 1% of $As_2O_3$+$Sb_2O_3$, 0 to 10% of $Fe_2O_3$, 0 to 10% of $Cr_2O_3$, 0 to 10% of NiO, 0 to 10% of $V_2O_5$, 0 to 10% of CuO, 0 to 10% of $MnO_2$, 0 to 10% of $MoO_3$, the total of $Fe_2O_3$+$Cr_2O_3$+

$NiO+V_2O_5+CuO+MnO_2+MoO_3$ being 0.5 to 10%, and 0 to 3% of $CeO_2$, 0.1 to 10% by weight of fluorine (F) and 0.1 to 20% by weight of chlorine (Cl), molding the molten material, vitrifying the molded material and subjecting the vitrified material to crystallizing treatment, and which contains at least 0.05% by weight of chlorine after the crystallizing treatment.

DETAILED DESCRIPTION OF THE PREFERRED EMBODIMENTS

The detailed description will be made on the present invention.

The raw materials used herein for the glass include those ordinarily used in the art, such as oxides, carbonates, nitrates, sulfates, halides, hydroxides, silicates, phosphates and borates of the above-described components.

The glass is produced by suitably selecting the raw compounds, mixing them in a predetermined proportion and melting the obtained mixture at a high temperature of 1,250° to 1,550° C. Fluorine and chlorine are added by replacing one or more of the above-described oxides with a fluoride and chloride. The molten raw material is molded into a predetermined shape such as a disk by press molding, casting with a mold, rolling or the like, and then the product is vitrified. Thereafter, the temperature is elevated to about 500° to 650° C. to form crystal nuclei and then the secondary heat treatment is conducted at about 550° to 850° C. for about 0.5 to 3 hours to form the crystals. The crystals thus formed are mainly α-quartz, $Li_2O \cdot SiO_2$, $Li_2O \cdot 2SiO_2$, etc.

In the ingredients of the glass, $SiO_2$ is a main ingredient of the formed crystals. When the amount of $SiO_2$ is smaller than 55%, the crystals become unstable and, on the contrary, when it exceeds 85%, the melting temperature of the raw material for the glass becomes excessively high undesirably.

Also $Li_2O$ is another main ingredient of the formed crystals. When the amount of $Li_2O$ is smaller than 5%, the crystals become unstable and, on the contrary, when it exceeds 20%, the melting temperature of the raw material for the glass becomes excessively high.

Although $K_2O$ and $Na_2O$ are effective in improving the meltability of the raw material for the glass, the amounts of K and Na are desirably as small as possible from the viewpoint of the reliability because they have a high mobility in the glass and they are easily eluted. Hereinafter, the "meltability" or "meltability of glass" is used to mean the meltability of a raw material for glass.

Although MgO and ZnO are effective in improving the meltability and controlling the formed crystals, the intended crystals cannot be easily obtained when they are incorporated in an excess amount.

Although CaO, SrO and BaO also improve the meltability, the intended crystals cannot be obtained and the crystal grains become coarse when they are used in an excess amount.

Although $Al_2O_3$ improves the chemical durability and hardness of the glass, the melting temperature of the glass-forming raw material becomes excessively high and the phase separation of the glass is inhibited undesirably when it is used in an amount of more than 10%.

Although $B_2O_3$ improves the meltability of the glass, the intended crystals cannot be obtained when it is used in an amount of more than 15%.

Although $P_2O_5$ is a nucleating agent for the glass, the crystals are unstabilized when more than 6% of $P_2O_5$ is used.

$TiO_2$ and $ZrO_2$ are used as nucleating agents and $As_2O_3$ and $Sb_2O_3$ are used as refining agents.

When the amount of F used for controlling the crystallization is smaller than 0.1% by weight, the formation of the fine crystals becomes difficult and, on the contrary, when it exceeds 10% by weight, the glass becomes unstable and the homogeneous glass cannot be easily obtained.

According to the present invention, it has been succeeded to reduce in size of the formed crystals and to remarkably lower the melting temperature of the raw materials for the glass by adding chlorine.

The crystallized glass of the present invention is obtained by taking advantage of the facts that the formation-growing step of microcrystal nuclei is controlled by relationship between spinodal wave length and spinodal temperature in an $Li_2O$-$B_2O_3$-$SiO_2$ spinodal decomposition-type phase-separation glass, namely by taking advantages of the fact that the spinodal wave length is determined by the degree of super cooling from the spinodal temperature, and, when the crystal nuclei are formed while the separated phase is formed, microcrystals are formed in a large amount depending on the average width of the separated phases and the number thereof. Chlorine has an effect that when it is added, the crystal size is further reduced. Although chlorine is an ingredient easily volatile from the raw materials for the glass in the melting step, it is supposed that in the present invention, added chlorine remains even after the vitrification to accelerate the formation of the crystal nuclei, and the formed crystals are reduced in size by this function. Since this effect is not remarkable in the absence of fluorine, the effect is supposed to be a synergistic effect with fluorine. For forming crystals having a grain size smaller than 0.3 μm at the crystallization temperature, it is necessary that chlorine remains in an amount of at least 0.05% by weight, particularly in the range of 0.1 to 2.0% by weight, in the glass after the vitrification. Since the crystal grains are reduced in size, the surface roughness (Ra) after polishing the surface of the obtained substrate becomes extremely low and even not more than 10 Å.

By adding chlorine to the raw materials for the glass, the melting temperature of the materials can be lowered by, at most, about 100° C. For Example, the crystallized glass of some composition of the present invention can be molten at 1,400° C. or below, while an ordinary chlorine-free crystallized $SiO_2$-$Li_2O$-$MgO$-$P_2O_5$ glass is not molten below about 1,450° C.

The above-described effects cannot be obtained when the amount of chlorine added is below 0.1% by weight and, on the contrary, when it exceeds 20% by weight, the glass becomes unstable and the homogeneous, crystallized glass cannot be obtained. Chlorine is desirably added in an amount in the range of 0.5 to 12.0% by weight.

In the present invention, a glass which is crystallized at a lower temperature can be produced and microcrystals having a smaller crystal size are formed by adding at least one of oxides of Fe, Cr, Ni, V, Cu, Mn and Mo. Since these oxides are effective in improving the laser beam absorption property, the precise texturing with a laser is made possible to obtain disks having excellent CSS characteristics. Supposedly, Fe, Cr, etc. contribute to the improvement in the mechanical strength, and the strength is scarcely lowered even though the crystal size is reduced. The total amount of the oxides is preferably 0.5 to 10% by weight. When the total amount of the oxides is below 0.5% by weight, the intended effects cannot be obtained and, on the contrary, when it exceeds 10% by weight, the melting becomes difficult or the crystal grains become coarse to make the production of the desired crystals impossible.

$CeO_2$ is effective in stabilizing the valences of Fe, Cr, Ni, V, Cu, Mn and Mo ions in the glass.

$SnO_2$ controls the valences of Cu and others in the glass like $CeO_2$ and, in addition, it acts also as a nucleating agent.

The following Examples will further illustrate the present invention.

EXAMPLE 1

Raw materials for glass were mixed together by an ordinary method to obtain a mixture consisting of, in terms of oxide, 74.8% by weight of $SiO_2$, 9.5% by weight of $Li_2O$, 3.5% by weight of $K_2O$, 2.0% by weight of MgO, 1.0% by weight of ZnO, 3.0% by weight of $Al_2O_3$, 2.0% by weight of $P_2O_5$, 0.2% by weight of $As_2O_3$, 1.0% by weight of F and 3.0% by weight of Cl. The mixture was molten with an ordinary melting apparatus at about 1,390° C. The melt was homogenized by stirring, molded to form a block, which was slowly cooled to obtain a glass. The glass was heated to a nucleating temperature of 570° C. at a temperature-elevation rate of about 10° C./min and kept at that temperature for 1 h. The temperature was further elevated to 810° C. at a temperature-elevation rate of about 10° C./min and kept at that temperature for 2 h to form microcrystals in the glass, thereby obtaining a crystallized glass.

The crystals mainly comprised α-quartz, and $Li_2O \cdot SiO_2$ and $Li_2O \cdot 2SiO_2$ were also crystallized. The amount of chlorine remaining in the crystallized glass was 0.4% by weight.

The surface of the crystallized glass thus obtained was observed with an SEM (scanning electron microscope) to find that the average crystal size was about 0.22 μm. The structure was dense and homogeneous, free from anisotropy or defects, and had an excellent chemical durability.

The glass was polished with $CeO_2$ as the abrasive to obtain the smooth surface having a surface roughness (Ra) of 8 Å. This value is suitable for a high-density recording disk.

The glass had a specific gravity of 2.36, Young's modulus of 9,365 kgf·mm$^{-2}$, Vickers hardness of 700 kgf·mm$^{-2}$ and thermal expansion coefficient of $8.7 \times 10^{-6} K^{-1}$.

EXAMPLES 2 to 4

A crystallized glass was obtained in the same manner as that of Example 1 except that the composition of the glass-forming raw material and its melting temperature were altered to those given in Table 1. The properties of the glass are also given in Table 1.

COMPARATIVE EXAMPLE 1

Raw materials were mixed together to obtain a mixture consisting of, in terms of oxide, 75.9% by weight of $SiO_2$, 9.9% by weight of $Li_2O$, 3.8% by weight of $K_2O$, 2.2% by weight of MgO, 0.8% by weight of ZnO, 4.3% by weight of $Al_2O_3$, 1.8% by weight of $P_2O_5$, 0.3% by weight of $As_2O_3$ and 1.0% by weight of F. The mixture was molten at about 1,480° C., and then molded, vitrified and crystallized in the same manner as that of Example 1.

Thus obtained crystallized glass had an average crystal size of about 0.50 μm.

The glass was polished with $CeO_2$ to obtain a surface roughness of 18 Å.

TABLE 1

| Composition of raw material for glass (wt. %) | Example 1 | Example 2 | Example 3 | Example 4 | Comparative Example 1 |
|---|---|---|---|---|---|
| $SiO_2$ | 74.8 | 69.8 | 79.0 | 61.0 | 75.9 |
| $Li_2O$ | 9.5 | 12.5 | 11.0 | 15.0 | 9.9 |
| $K_2O$ | 3.5 | 1.5 | 2.5 | 4.0 | 3.8 |
| MgO | 2.0 | 1.5 | 1.0 | 2.5 | 2.2 |
| CaO | — | 1.0 | — | — | — |
| SrO | — | 1.0 | — | — | — |
| ZnO | 1.0 | 1.0 | — | 1.0 | 0.8 |
| $Al_2O_3$ | 3.0 | 1.5 | 1.0 | 2.0 | 4.3 |
| $B_2O_3$ | — | 3.0 | — | 4.0 | — |
| $P_2O_5$ | 2.0 | 3.5 | 1.5 | 3.5 | 1.8 |
| $As_2O_3$ | 0.2 | 0.2 | 0.2 | — | 0.3 |
| $Sb_2O_3$ | — | — | 0.2 | — | — |
| F | 1.0 | 0.5 | 0.6 | 2.0 | 1.0 |
| Cl | 3.0 | 4.0 | 2.0 | 5.0 | — |
| Amount of Cl after crystallization (wt. %) | 0.4 | 0.6 | 0.4 | 0.8 | — |
| Melting temperature (°C.) | 1390 | 1320 | 1400 | 1230 | 1480 |
| Crystallization temperature (°C.) | 810 | 810 | 810 | 810 | 810 |
| Crystal size (μm) | 0.22 | 0.23 | 0.23 | 0.29 | 0.50 |
| Surface roughness Ra (Å) | 8 | 9 | 9 | 10 | 18 |

EXAMPLE 5

Raw materials were mixed together to obtain a mixture consisting of, in terms of oxide, 70.0% by weight of $SiO_2$, 9.2% by weight of $Li_2O$, 3.6% by weight of CaO, 1.9% by weight of BaO, 1.0% by weight of ZnO, 4.0% by weight of $Al_2O_3$, 2.0% by weight of $P_2O_5$, 0.5% by weight of $Sb_2O_3$, 4.6% by weight of $Fe_2O_3$, 0.5% by weight of $CeO_2$, 0.9% by weight of F and 1.8% by weight of Cl. The mixture was molten at about 1,400° C., the melt was homogenized by stirring, then molded into a disk shape and cooled to vitrify the product. The glass was heated to 600° C. at a temperature-elevation rate of about 10° C./min, and kept at that temperature for 1 h to conduct the primary heat treatment. Then, the glass was further heated to 665° C. at a temperature-elevation rate of about 10° C./min and kept at that temperature for 1 h to obtain the crystallized glass.

The crystals thus formed were mainly α-quartz, $Li_2O \cdot 2SiO_2$, etc. The amounts of fluorine and chlorine remaining in the crystallized glass thus obtained were 0.1% by weight and 0.3% by weight, respectively.

The glass surface was observed with an SEM to find that the grain size of the crystals was about 0.08 μm on average and that the structure was dense and homogeneous, and no anisotropy or defect was observed.

After the glass was polished with $CeO_2$, the surface roughness (Ra) was about 4 Å. The glass had a specific gravity of 2.50, Young's modulus of 13,000 kgf·mm$^{-2}$ and Vickers hardness of 590 kgf·mm$^{-2}$.

The laser beam absorption property of a test piece having a thickness of 0.635 mm was examined to find that it had an absorbance of 0.48 and transmittance of 34.0% for a light of a wave length of 1,064 nm, and an absorbance of 0.41 and transmittance of 38.8% for a light of a wave length of 532 nm. The texturing with a laser at such a wave length was also excellent. On the other hand, the Fe-free glass produced in Example 1 scarcely absorbed these laser beams, and the absorbance was 0.02 and transmittance was 95.7 at 1,064 nm.

EXAMPLES 6 to 9

Crystallized glasses were produced in the same manner as that of Example 5 except that the composition, primary heat treatment temperature and crystallization temperature were altered as given in Table 2. The properties of the glass are given in Table 2.

TABLE 2

| Composition of raw material for glass (wt.%) | Example | | | | |
|---|---|---|---|---|---|
| | 5 | 6 | 7 | 8 | 9 |
| $SiO_2$ | 70.0 | 69.4 | 71.9 | 70.8 | 71.2 |
| $Li_2O$ | 9.2 | 9.1 | 9.5 | 13.5 | 9.2 |
| CaO | 3.6 | 3.6 | 3.8 | — | 3.7 |
| BaO | 1.9 | 1.9 | 2.1 | 1.5 | 2.1 |
| ZnO | 1.0 | 1.0 | 1.1 | 1.0 | 1.0 |
| $Al_2O_3$ | 4.0 | 3.9 | 4.2 | 1.5 | 4.1 |
| $B_2O_3$ | — | — | — | 3.0 | — |
| $P_2O_5$ | 2.0 | 2.0 | 2.2 | 3.5 | 2.1 |
| $Sb_2O_3$ | 0.5 | 0.5 | 0.5 | 0.2 | 0.5 |
| $Fe_2O_3$ | 4.6 | 2.7 | — | 0.1 | — |
| $Cr_2O_3$ | — | — | 1.8 | 0.1 | — |
| NiO | — | — | — | 0.1 | — |
| $V_2O_5$ | — | 2.7 | — | 0.1 | 2.8 |
| CuO | — | — | — | 0.1 | — |
| $MnO_2$ | — | — | 0.1 | — | — |
| $MoO_3$ | — | — | 0.02 | — | — |
| $CeO_2$ | 0.5 | 0.5 | — | — | 0.5 |
| F | 0.9 | 0.9 | 0.9 | 0.5 | 0.9 |
| Cl | 1.8 | 1.8 | 1.9 | 4.0 | 1.9 |
| Amount of Cl after crystallization (wt. %) | 0.3 | 0.1 | 0.3 | 0.5 | 0.3 |
| Melting temperature (°C.) | 1400 | 1400 | 1400 | 1400 | 1400 |
| Primary heat treatment temperature (°C.) | 600 | 500 | 560 | 520 | 500 |
| Crystallization temperature (°C.) | 665 | 550 | 630 | 575 | 550 |
| Crystal size (μm) | 0.08 | 0.07 | 0.05 | 0.20 | 0.10 |
| Surface roughness Ra (Å) | 4 | 10 | 4 | 9 | 5 |
| Optical properties (at λ = 1,064 nm) | | | | | |
| Absorbance | 0.48 | 0.33 | 0.55 | 0.18 | 0.09 |
| Transmittance (%) | 34.0 | 47.2 | 27.8 | 66.5 | 82.3 |

Since the crystallized glass of the present invention forms microcrystals having a grain size of not larger than 0.3 μm, the glass is usable for producing substrates for magnetic disks or optomagnetic disks having a surface roughness of 10 Å or below and is also usable for the high-density recording.

Since the raw material for glass has a low melting temperature, it is usable for the mass production of glass substrates free from foams or striae at a low cost. Further, the glass has a low specific gravity, excellent mechanical strength and chemical durability, and is easily moldable. Thus, the glass has extremely desirable characteristics as a material for substrates for information-recording media.

Further, according to the present invention, substrates for disks having excellent texturing with a laser can be obtained.

What is claimed is:

1. A crystallized glass for a substrate of an information-recording disk, which has been obtained by melting a raw material for glass consisting essentially of, in weight percentages in terms of oxide, 55 to 85% of $SiO_2$, 5 to 20% of $Li_2O$, 0 to 10% of $K_2O+Na_2O$, 0 to 10% of MgO, 0 to 20% of CaO, 0 to 10% of SrO, 0 to 10% of BaO, 0 to 10% of ZnO, 0 to 10% of $Al_2O_3$, 0 to 15% of $B_2O_3$, 0 to 6% of $P_2O_5$, 0 to 3% of $TiO_2$, 0 to 3% of $ZrO_2$, 0 to 3% of $SnO_2$ and 0 to 1% of $As_2O_3+Sb_2O_3$, 0.1 to 10% by weight of fluorine (F) and 0.1 to 20% by weight of chlorine (Cl), molding the molten material, vitrifying the molded material and subjecting the vitrified material to crystallizing treatment, and which contains at least 0.05% by weight of chlorine after the crystallizing treatment.

2. A crystallized glass for a substrate of an information-recording disk, which has been obtained by melting a raw material for glass consisting essentially of, in weight percentages in terms of oxide, 55 to 85% of $SiO_2$, 5 to 20% of $Li_2O$, 0 to 10% of $K_2O+Na_2O$, 0 to 10% of MgO, 0 to 20% of CaO, 0 to 10% of SrO, 0 to 10% of BaO, 0 to 10% of ZnO, 0 to 10% of $Al_2O_3$, 0 to 15% of $B_2O_3$, 0 to 6% of $P_2O_5$, 0 to 3% of $TiO_2$, 0 to 3% of $ZrO_2$, 0 to 3% of $SnO_2$, 0 to 1% of $As_2O_3+Sb_2O_3$, 0 to 10% of $Fe_2O_3$, 0 to 10% of $Cr_2O_3$, 0 to 10% of NiO, 0 to 10% of $V_2O_5$, 0 to 10% of CuO, 0 to 10% of $MnO_2$, 0 to 10% of $MoO_3$, the total of $Fe_2O_3+Cr_2O_3+NiO+V_2O_5+CuO+MnO_2+MoO_3$ being 0.5 to 10%, and 0 to 3% of $CeO_2$, 0.1 to 10% by weight of fluorine (F) and 0.1 to 20% by weight of chlorine (Cl), molding the molten material, vitrifying the molded material and subjecting the vitrified product to crystallizing treatment, and which contains at least 0.05% by weight of chlorine after the crystallizing treatment.

* * * * *